United States Patent [19]

Rohner

[11] 4,104,689

[45] Aug. 1, 1978

[54] VACUUM CONTACTOR PROTECTOR

[75] Inventor: Thomas G. Rohner, Minneapolis, Minn.

[73] Assignee: Electric Machinery Manufacturing Company, Minneapolis, Minn.

[21] Appl. No.: 727,663

[22] Filed: Sep. 29, 1976

[51] Int. Cl.² .................. H02H 7/22; H02H 3/28
[52] U.S. Cl. ........................................ 361/44; 361/2
[58] Field of Search ............ 361/2, 5, 42, 44, 45, 361/47, 31, 109, 110; 340/255, 256, 253 R, 253 B, 253 H, 253 N; 200/144 B

[56] References Cited

U.S. PATENT DOCUMENTS

| | | | |
|---|---|---|---|
| 3,599,041 | 8/1971 | Boersma et al. | 340/255 X |
| 3,611,340 | 10/1971 | Harte et al. | 340/255 |
| 3,641,359 | 2/1972 | McCarty | 361/2 |
| 3,764,853 | 10/1973 | Beachley, Jr. | 361/44 |
| 4,024,439 | 5/1977 | McClain et al. | 361/31 X |

Primary Examiner—Patrick R. Salce
Attorney, Agent, or Firm—Merchant, Gould, Smith, Edell, Welter & Schmidt

[57] ABSTRACT

A circuit for detecting arcing in a vacuum contactor in a polyphase system, caused by development of an air leak. A current transformer and sensing means, which may be independent of or which may work in conjunction with a conventional ground fault relay, senses the unbalanced leakage current and activates warning and protection circuits so as to prevent damage to the rest of the system. The protection system is activated or switched into a higher sensitivity mode when the vacuum contactor is supposed to be open so as to detect relatively small leakage currents. When the vacuum contactor is supposed to be closed, the system is disabled or is operated in a lower sensitivity mode so as to detect ground faults, but so as not to be tripped by normal surges and transients during operation of the system.

9 Claims, 2 Drawing Figures

4,104,689

VACUUM CONTACTOR PROTECTOR

BACKGROUND OF THE INVENTION

The present invention relates to the field of electrical power control apparatus, and more specifically to apparatus employing vacuum interrupters.

Vacuum interrupters are widely used in high voltage, high power electrical systems, either as circuit breakers or contactors for large loads.

A vacuum interrupter typically involves a pair of contacts inside a sealed air-tight vessel. One of the contacts is mechanically movable to and away from the other contact, for example by means of a bellows arrangement. By keeping air away from the contacts inside the vacuum interrupter, the interrupter is able to switch large electrical loads without the problem of arcing.

In switching large polyphase loads, generally a plurality of interrupters is provided, one for each phase. a mechanical actuator linkage connects to each of the interrupters and is usually operated electromechanically under control of a device which is a part of a control system. For example, in the case of a polyphase motor, the actuator which mechanically opens and closes the vacuum interrupter on each phase of the supply might be controlled by a motor starting control system, as is generally known in the art.

It sometimes happens that a small leak will develop in the interrupter vessel allowing air to enter. Depending on the amount of air in the vessel, the possibility exists that more severe arcing than is normal may occur within the vessel during an attempt at breaking the circuit. Also, depending on the amount of air in the vessel, this arcing may continue after the contacts are fully opened. In the prior art, the possibility of arcing in a leaky interrupter has generally not been regarded as a serious problem. According to conventional reasoning, since the other interrupters in the remaining phases are assumed good, the other phase circuits will be broken and there will be no possible return path for any arcing current in the leaky interrupter.

It has been discovered, however, that a number of serious problems can result from a leaky vacuum interrupter in a single phase and the present invention has been made to detect such a condition and to activate protection circuity or otherwise warn of the potentially dangerous situation so as to prevent further damage or hazards from developing. One obvious problem which can develop if one interrupter vessel is already leaking, is that if a second interrupter vessel should start leaking, there would be a path for current to flow, resulting in single phase current containing after the supposed opening of the contactor. This could lead to heating and damage to both interrupter vessels, and probably damage to the motor or other load due to operation from a single phase.

A second problem is the possibility of welded contacts. In the first place, it should be recognized that even if an interrupter vessel has leaked full of air, no particular problem is presented during operation of the load, when the contactor is supposed to be closed. The problem results when the contactor is attempted to be opened, which can lead to arcing within the leaking interrupter, through a ground path circuit including surge capacitors and inherent parasitic capacitances. While the ground path current may not be very large compared with the high power levels involved elsewhere in the system, the ground path may be sufficient to establish and maintain arcing through the leaky interrupter during the entire time period that the contactor is supposed to be open. When the contactor is subsequently reclosed, the contacts in the arcing interrupter may have become so hot as to weld together, jamming the entire contactor and preventing it from being released. Alternatively, due to mechanical play in the linkage which actuates all the interrupters, it may be possible that upon reopening, one of the interrupters may actually travel far enough to break its circuit while the welded contact and another remain closed, thus single phasing the load with probable severe damage.

Another potential problem may occur when personnel attempt to open the power cabinet to inspect or work on the contactor. Typically, means are provided so that when the cabinet is opened, high voltage is disconnected from the contactor mechanism by slow moving contacts which are not designed to break load currents. Ordinarily, a mechanical interlock is provided to prevent opening the cabinet unless the actuator is in the off position. However, due to continued arcing or perhaps a welded contact, a considerable amount of current may actually be flowing in one or more of the phases. When the contactor assembly is then disconnected, this current is required to be interrupted by the slow moving contacts. However, these contacts are totally inadequate for handling large magnitudes of current and severe arcing may result, developing into line to line or line to neutral faults.

SUMMARY OF THE INVENTION

According to the present invention, there is provided means for protecting a power system having a vacuum contactor against damage caused by the development of leakage therein. Means are provided for sensing current imbalance in the power system, and further means connected to said sensing means and responsive thereto provide output signals indicative of whether the imbalance exceeds a predetermined magnitude. Means are provided for selectively disabling the output signal of the protection apparatus depending upon the on or off condition of the contactor, so as to render the protection apparatus insensitive to large imbalance transients during normal operation with the contactor closed.

According to another aspect of the invention, the protection apparatus for the vacuum contactor system may work in conjunction with a ground fault system. The vacuum contactor protector system may operate from the ground fault relay or from the same current transformer or other current sensing device as is used in the ground fault system. The vacuum contactor protection system has a higher sensitivity than the ground fault system, but is enabled only when the contactor is in its open position, so as to detect leakage currents which would otherwise be too small to be detected by the ground fault system which has relatively lower sensitivity.

The output of the detection system can be coupled to a system shut-down device, a lock-out device, or other warning or protection apparatus.

DESCRIPTION OF THE PREFERRED EMBODIMENT

Figure 1:
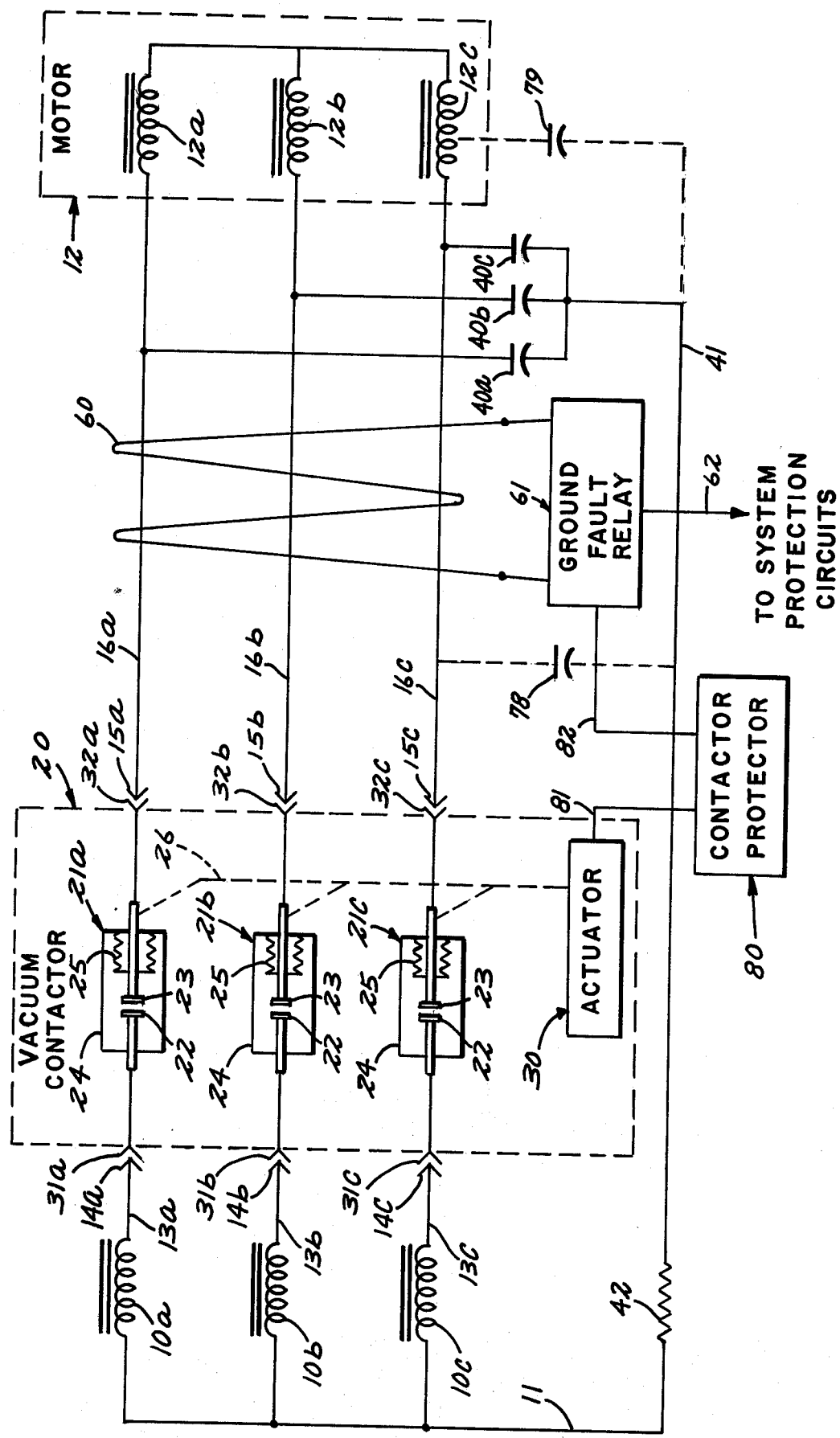
FIG. 1 is a schematic diagram of a polyphase power system with the contactor protection circuit of the present invention shown in block diagram form.

The present invention is applicable to any polyphase system operating any type of load, but for purposes of illustration, a three-phase system operating an electrical motor will be discussed. In FIG. 1, reference 10a, 10b and 10c designate secondary windings for the individual phases of a three-phase power supply system. One end of each of the secondaries is connected to a common lead designated by reference number 11. A motor generally designated by reference number 12 contains individual windings for the three phases indicated by reference numbers 12a, 12b and 12c.

Reference number 20 generally designates a contactor assembly which includes individual vacuum interrupters 21a, 21b and 21c. Each interrupter includes a pair of contacts 22, 23, a vacuum vessel 24, and a bellows 25 permitting movement of one of the contacts 23 alternately towards and away from contact 22, while still maintaining a vacuum within the vessel 24. A mechanical linkage indicated by broken line 26 interconnects all of the interrupters. Linkage 26 is in turn connected to a suitable actuator 30 which, for example, may be solanoid controlled by a conventional control system (not shown) for the motor.

Contactor 20 may be mounted in a power cabinet, with electrical connection and disconnection being provided by means of pairs of mating slow moving contacts or stabs. Stabs 31a and 32a connect electrically to the contacts of vacuum interrupter 21a. In similar manner, stabs 31b and 32b connect to vacuum interrupter 21b, and stabs 31c and 32c are electrically connected to interrupter 21c.

The other side of transformer winding 10a connects by means of a lead 13a to a stab or contact 14a, which mates with stab 31a. In the same manner, transformer secondary 10b connects through a lead 13b to contact 14b and transformer winding 10c connects through a lead 13c to contact 14c.

On the other side of draw-out contactor 20, contacts or stabs 15a, 15b and 15c mate with stabs 32a, 32b and 32c. Power leads 16a, 16b and 16c connect from the respective stabs to convey the three phases to motor 12. Surge capacitors 40a, 40b and 40c connect from power leads 16a, 16b and 16c respectively, to ground lead 41. Ground lead 41 connects to the neutral 11 of the three-phase source. A resistor 42 or other impedance may be provided in the ground path to limit fault currents.

A current transformer 60 is placed around the three power leads 16a, 16b and 16c. Current transformer 20 connects to a ground fault relay 61, indicated in block diagram form in FIG. 1. The output of ground faulty relay 61 is indicated by lead 62, which would connect to system lock-out or shut-off circuitry as is generally known in the prior art. The contactor protection circuit 80 according to the present invention is indicated in block diagram form in FIG. 1, with connections to actuators 30 indicated by a control line 81, and to ground fault relay 61 via control line 82.

In normal operation of the circuit of FIG. 1, actuator 30 is operated to cause closure or opening of the vacuum contactor to make and break the power circuit to motor 12. Ground faulty relay 61 and current transformer 60 serve to monitor the three phases for gross imbalances which would indicate an accidental grounding of a phase.

To illustrate the problem solved by the present invention, assume that a leak has developed in the vacuum vessel 24 of vacuum interrupter 21c. Assume also that motor 12 has been shut down in the course of normal operation by actuator 30, and that the contact pairs of each of the vacuum interrupters have been drawn apart. However, a current path remains available to phase c of the system, through surge capacitor 40c to ground 41 and through ground resistor 42 to neutral point 11.

Also, inherent or parasitic capacitances are present along power lead 16c and in the windings of the motor or other load. Capacitor 78, in dotted lines in FIG. 1, symbolically indicates the parasitic capacitances between power lead 16c and ground 41. Similarly, capacitor 79 symbolically designates the parasitic capacitances between motor winding 12c and ground 41. It will be appreciated that similar parasitic capacitances exit between the other phases and ground, and between the various phases, but these have not be indicated in FIG. 1 in order to simplify the drawing. The present discussion concerning a leak in interrupter 21c and currents in the parasitic capacitances associated therewith is equally applicable to the same type of fault in any other phase.

The leakage current thus established through arcing in vacuum interrupter 21c will generally not be detected by ground fault relay 61 because of its relatively low sensitivity. Ground fault relay 61 is necessarily designed with low enough sensitivity to avoid nuisance trips due to imbalance among the phases caused by normal transients in the operation of the system. These normal transient imbalances may in a typical system be of a magnitude of 8 to 10 amps or momentarily higher.

The leakage current through arcing interrupter 21c, the surge capacitors and the parasitic capacitances may be less than the amount required to trigger the ground fault relay, but still can be of high enough magnitude to have a great potential for damage. As pointed out above, should another interrupter begin to lead and arc, a single phasing path would be established to the motor leading to probable severe damage or destruction of the motor. Another serious problem can result from welding of contacts heated by continual arcing, upon reclosing of the contacter. As discussed more fully above, this can jam the contactor or can result in jamming with one phase open and the others closed, also resulting in single phasing of the motor. Another possible problem referred to above would involve attempted opening of the power cabinet by personnel who are unaware of the arcing current in the leaky interrupter. The leakage current would then have to be broken or interrupted by disconnection of slow moving contacts or stabs 31c–14c and 32c–15c, which are designed only for disconnect purposes and are not capable of breaking significant currents. Arcing upon disconnect at these slow moving contacts can lead to serious faults within the power cabinet as previously explained. The fact that a mechanical interlock may be provided to prevent opening of the cabinet unless the actuator 30 is in the off position will be to no avail in preventing such faults, because the arcing current in the leaky vacuum interrupter may continue even though the contactor is fully open.

The present invention provides a means for sensing an arcing interrupter so as to provide a warning for locking out the system or taking other protective action to prevent the arcing current from leading to one of the more serious problems indicated above. A preferred embodiment of the contactor protector 80 of the present invention is shown in greater detail in FIG. 2. This embodiment operates in conjunction with a conventional ground fault relay circuit 61, although it will be appreciated that according to the principle of the present invention, the vacuum contactor protector could be made independent of the ground fault relay.

Figure 2:
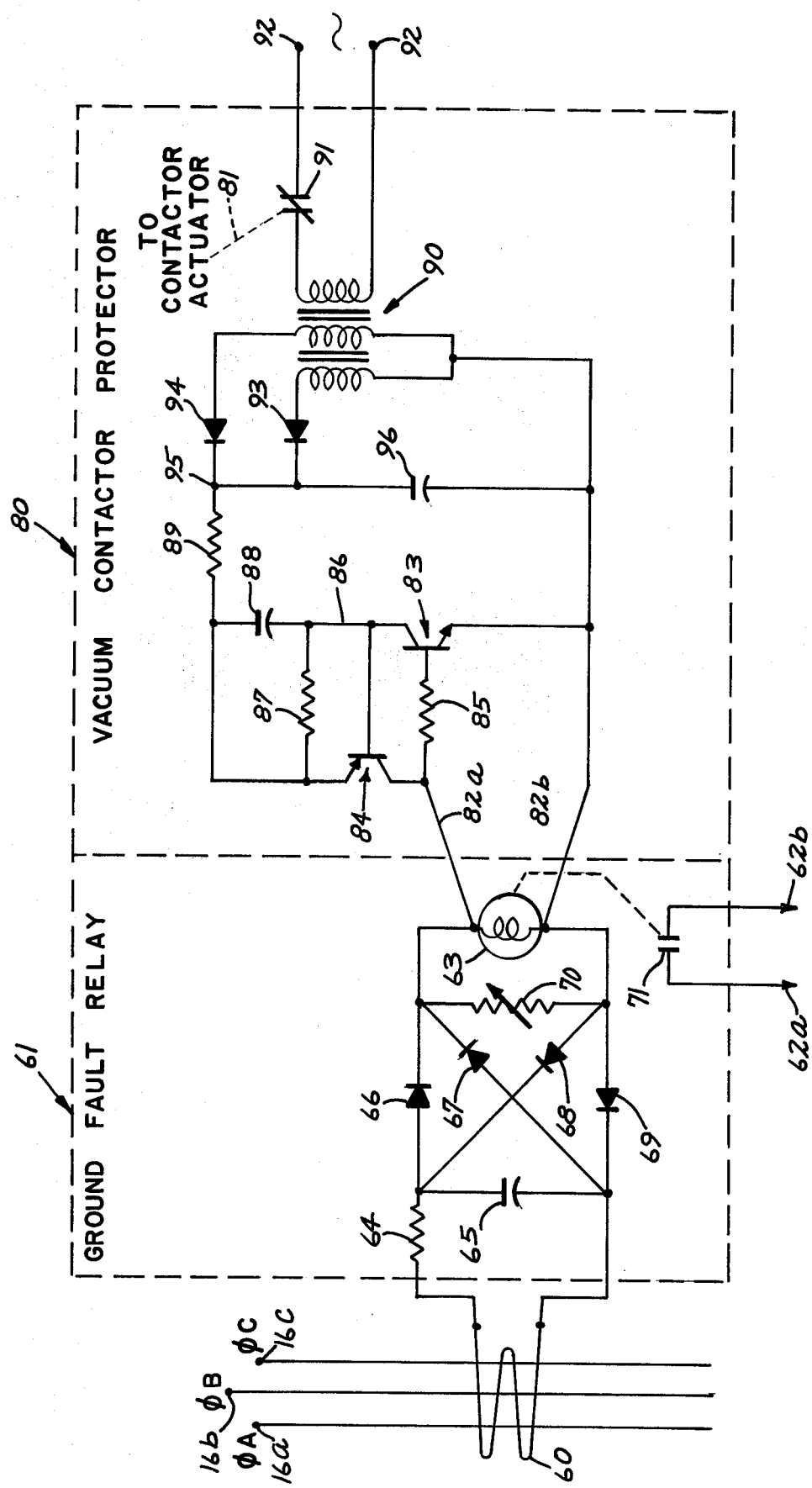
FIG. 2 is a schematic diagram of one embodiment of a protection circuit according to the present invention.

In FIG. 2, current transformer 60, which encircles power leads 16a, 16b and 16c, is connected through a rectifier circuit to a relay coil 63. The rectifier circuit includes a resistor 64, a shunt capacitor 65, a diode bridge including diodes 66, 67, 68 and 69, and an adjustment resistor 70 which is in parallel with relay coil 63. Relay contacts 71 are operated by relay coil 63, and these contacts connect by means of leads 62a and 62b to an external protection system (not shown) for system protection in case of a ground fault or a leaking vacuum interrupter. If the imbalance among the phases is great enough, sufficient current will be induced in transformer 60 to develop the necessary voltage to pull in relay 63. The design of the relay and associated components sets the pull-in sensitivity of the ground fault relay as is generally known in the prior art.

Relay 63 is also connected by means of leads 82a and 82b for operation by the vacuum contactor protection circuit 80. Lead 82b forms the signal reference ground for circuit 80. A pair of transistors 83 and 84 are included in the circuit. The emitter of transistor 83 connects to signal reference ground 82b, and the base connects through a resistor 85 to lead 82a, which also connects to the collector of transistor 84. The collector of transistor 83 connects to a lead 86 which connects to the base of transistor 84, and to a resistor 87 and a capacitor 88. The other side of resistor 87 and capacitor 88 are connected to a DC power supply line through a current limiting resistor 89. The power supply includes a transformer generally indicated by reference number 90. The primary of transformer 90 connects through normally closed contacts 91 to a source of alternating current power applied at terminals 92. Contacts 91 operate under control of the mechanism which actuates the vacuum contactor, as explained hereinafter. Transformer 90 has a center tapped secondary which connects to signal reference ground 82b and through rectifying diodes 93 and 94 to a lead 95. Power supply current limiting resistor 89 connects to lead 95, and a filter capacitor 96 is provided between lead 95 and a single reference ground 82b.

In operation, transistor 83 serves to sense the voltage appearing across ground faulty relay operating coil 63, while transistor 84 serves to turn on coil 63 when it is in turn triggered by transistor 83. Relay coil 63 can thus be triggered by either of two circuits: the relatively low sensitivity ground fault relay 61, or the relatively high sensitivity vacuum contactor protector circuit 80. In the embodiment of FIG. 2, vacuum contactor protector circuit 80 is switched on and off in response to the operation of actuator 30 for the vacuum contactor 20. When contactor 20 is closed to supply power to the motor, contacts 91 are opened, disabling circuit 80. The operative connection between actuator 30 and contacts 91, indicated in the figures by control line 81, can be provided by any suitable means. For example, contacts 91 can be an aditional set of contacts on an operating relay associated with actuator 30, or contacts 91 can be provided by a sensing switch associated with the actuator.

With contactor 20 closed, there will be no arcing in any vacuum interrupter even if there is a leak, so circuit 80 is disabled and relay driver 63 in FIG. 2 operates in the conventional manner to detect gross imbalances indicating a ground fault.

When actuator 30 causes contactor 20 to open breaking current to motor 12, power is applied to transformer 90 of contactor protector 80. A DC operating voltage is developed at lead 95 to operate the circuit. Both transistors 83 and 84 are presumed to be off. With no voltage or only very little voltage being developed across coil 63, no significant base drive is applied to transistor 83 and no collector current will be drawn through resistor 87, thus holding the base and collector of transistor 84 at the same potential with transistor 84 being cut off.

If current remains flowing through one of the phases due to arcing in a leaky interrupter or due to welded contacts, a current will be induced in transformer 60 and a voltage will appear at relay driver 63. As previously explained, the magnitude of this voltage will in general not be sufficient to pull in relay 63, which is necessarily designed to ignore surges and transients in normal operation. However, the voltage at relay driver 63 will be applied across the base to emitter junction of transistor 83 causing it to start into conduction. Collector current for transistor 83 will create a voltage drop in resistor 87 thus developing a positive bias on the base to emitter junction of transistor 84. Transistor 84 will then turn on, providing a current path from power lead 95 through transistor 84 and relay driver 63 to return signal ground 82b. At the same time, each of the transistors will latch the other into an on condition so that the pull-in of relay 63 will be maintained. Capacitor 88 serves to prevent turn on transients within protection circuit 80 from triggering the transistors. Resistor 83 serves to limit base current to transistor 83 and resistor 89 serves to limit the drive current to coil 63 when the transistors are on.

Thus, a relatively small voltage applied at relay 63 by current transformer 60 will be sensed by transistor 83, causing transistor 84 to pull in the relay to activate the lock-out, shut-down or other warning circuits.

It will be appreciated that the principle of the present invention can also be accomplished by a single sensing circuit connected to current transformer 60, with means being provided for altering the gain or sensitivity of the circuit between a low sensitivity ground fault detection mode when vacuum contactor 20 is closed, and a high sensitivity vacuum interrupter leakage current detection when the vacuum contactor is supposed to be open. Such a gain or sensitivity altering circuit can be realized through any of a number of electronic techniques as are generally known in the prior art. Alternatively, two different threshold sensing devices could be provided, one with a lower threshold for vacuum contactor protection and the other with a higher threshold for ground fault detection, with appropriate logic for selection thereof according to whether the contactor is off or on.

What is claimed is:

1. Protection apparatus for a polyphase power system having vacuum contactors including actuating means therefor, comprising:

means for sensing current imbalance among the phases in the power system;

means connected to said sensing means and responsive thereto for providing an output signal indicative of whether said imbalance exceeds a predetermined magnitude indicative of an arcing contactor; and means responsive to the closed or open condition of said contactors, and operatively connected for disabling said output signal when said contactors are closed to prevent unwanted output signals from said responsive means when said contactors are closed.

2. Apparatus according to claim 1 wherein said sensing means includes a current transformer.

3. Apparatus according to claim 1 further including ground fault means connected to said sensing means and responsive thereto for providing an output signal when said imbalance exceeds a second predetermined magnitude higher than said first predetermined magnitude indicating the presence of a ground fault.

4. Apparatus according to claim 1 wherein said means responsive to said contactor includes relay contacts in circuit with said means for providing an output signal.

5. Protection apparatus for a power system having a vacuum contactor including actuating means therefor, comprising:

means for sensing current imbalance in said power system; and means connected to said sensing means and operatively associated with said vacuum contactor for providing an output signal indicating when said imbalance reaches a first predetermined value when said contactor is open or a second predetermined value larger than said first value, when said contactor is closed.

6. Apparatus according to claim 5 wherein said sensing means comprises a current transformer.

7. Apparatus according to claim 5 wherein said means for providing an output signal includes a ground fault relay connected to said sensing means, said ground fault relay operable to be energized by said sensing means, when said imbalance reaches said second predetermined value.

8. Apparatus according to claim 7 wherein said means for providing an output signal further includes a voltage responsive circuit connected to said ground fault relay for sensing the voltage applied thereto by said sensing means, and a driver circuit for energizing said relay when said voltage reaches said first predetermined value.

9. Apparatus according to claim 8 wherein said means for providing an output signal includes switching contacts for selectively removing power from said driver circuit in response to a closed condition of said contactor, whereby said driver circuit is inoperative and no output signal is provided upon reaching said first predetermined value of imbalance when said contactor is closed.

* * * * *